(12) United States Patent
De Almeida et al.

(10) Patent No.: US 8,715,372 B2
(45) Date of Patent: May 6, 2014

(54) DIESEL CYCLE FUEL COMPOSITIONS CONTAINING DIANHYDROHEXITOLS AND RELATED PRODUCTS

(75) Inventors: Rafael Menegassi De Almeida, Rio de Janeiro (BR); Carlos Rene Klotz Rabello, Rio de Janeiro (BR)

(73) Assignee: Petroleo Brasileiro S.A.—Petrobras, Rio de Janeiro (BR)

( * ) Notice: Subject to any disclaimer, the term of this patent is extended or adjusted under 35 U.S.C. 154(b) by 730 days.

(21) Appl. No.: 12/538,451

(22) Filed: Aug. 10, 2009

(65) Prior Publication Data

US 2010/0064574 A1    Mar. 18, 2010

(30) Foreign Application Priority Data

Sep. 17, 2008  (BR) .................................... 0803522

(51) Int. Cl.
*C10L 1/23*    (2006.01)
(52) U.S. Cl.
USPC .................................. 44/324; 44/350; 44/351
(58) Field of Classification Search
USPC ................... 44/301, 350, 351, 324, 437, 445
See application file for complete search history.

(56) References Cited

U.S. PATENT DOCUMENTS

| | | |
|---|---|---|
| 342,846 A | 4/1895 | Diesel |
| 608,845 A | 8/1898 | Diesel |
| 2,066,506 A | 1/1937 | Woodbury |
| 2,280,217 A | 4/1942 | Cloud |
| 2,575,543 A | 11/1951 | Young et al. |
| 3,490,237 A | 1/1970 | Lissant |
| 4,297,290 A | 10/1981 | Stockburger |
| 4,425,136 A | 1/1984 | Pearson et al. |

(Continued)

FOREIGN PATENT DOCUMENTS

WO    WO 2007/096511    8/2007

OTHER PUBLICATIONS

Shay, E.G. "Diesel Fuel from Vegetable Oils: Status and Opportunities", Biomass and Bioenergy (1993), vol. 4, pp. 227-242.

(Continued)

*Primary Examiner* — Ellen McAvoy
*Assistant Examiner* — Latosha Hines
(74) *Attorney, Agent, or Firm* — Nixon & Vanderhye P.C.

(57) ABSTRACT

Diesel cycle fuel compositions are described containing at least one dianhydrohexitol compound according to the general formula 2 and/or its Formula 2

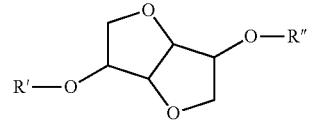

derived hydrocarbyl ethers or nitric ethers compounds, where the R' and R" substituents are both H or one or both of R' and R" is alkyl, cycloalkyl or phenyl, or one or both are —NO$_2$. A preferred fuel composition is that containing dimethyl isosorbide (DMI) added or not of isosorbide dinitrate (ISDN) as ignition improver. The dianhydrohexitols compounds form compositions with at least one of the components selected among petroleum-derived diesel fuel, biodiesel, ethanol and water. The mixture of DMI and ISDN has excellent cetane number (IQT). Still, the oxygenated nature of the dianhydrohexitols and related compounds of the fuel compositions inhibits soot formation upon burning of the said Diesel cycle fuel compositions.

14 Claims, 2 Drawing Sheets

(56) References Cited

U.S. PATENT DOCUMENTS

| | | | |
|---|---|---|---|
| 4,477,258 | A | 10/1984 | Lepain |
| 4,585,649 | A | 4/1986 | Lynch |
| 4,604,102 | A | 8/1986 | Zaweski et al. |
| 4,659,335 | A | 4/1987 | Wegner et al. |
| 4,705,534 | A | 11/1987 | Yan |
| 4,891,049 | A | 1/1990 | Dillon et al. |
| 4,992,605 | A | 2/1991 | Craig et al. |
| 5,096,462 | A | 3/1992 | Schulz et al. |
| 5,308,365 | A | 5/1994 | Kesling, Jr. et al. |
| 5,454,842 | A | 10/1995 | Poirier et al. |
| 5,820,640 | A | 10/1998 | Ikura et al. |
| 5,858,030 | A | 1/1999 | Waller et al. |
| 5,906,664 | A | 5/1999 | Basu et al. |
| 6,015,440 | A | 1/2000 | Noureddini |
| 6,156,081 | A | 12/2000 | Willis-New |
| 6,527,816 | B2 | 3/2003 | Deflort et al. |
| 6,578,870 | B2 | 6/2003 | Winkler et al. |
| 6,648,929 | B1 | 11/2003 | Daly et al. |
| 6,858,046 | B2 | 2/2005 | Daly et al. |
| 6,872,231 | B2 | 3/2005 | Huff, Jr. et al. |
| 7,014,668 | B2 | 3/2006 | Golubkov et al. |
| 7,029,506 | B2 | 4/2006 | Jordan |
| 7,182,797 | B2 | 2/2007 | Mekonen |
| 7,279,018 | B2 | 10/2007 | Jakkula et al. |
| 7,282,071 | B2 | 10/2007 | Lewis |
| 7,300,476 | B1 | 11/2007 | Huff, Jr. et al. |
| 7,374,587 | B2 | 5/2008 | Lewis |
| 2002/0026744 | A1 | 3/2002 | Golubkov et al. |
| 2002/0129541 | A1 | 9/2002 | Daly et al. |
| 2002/0152673 | A1 | 10/2002 | Huff, Jr. et al. |
| 2002/0174596 | A1 | 11/2002 | Deflort et al. |
| 2006/0096158 | A1 | 5/2006 | Robinson |
| 2006/0096160 | A1 | 5/2006 | Mekonen |
| 2006/0186020 | A1 | 8/2006 | Gomes |
| 2008/0083158 | A1 | 4/2008 | Renninger et al. |
| 2008/0146477 | A1* | 6/2008 | Mentink et al. ............... 510/109 |
| 2009/0253920 | A1* | 10/2009 | Sanborn et al. ............... 549/464 |
| 2010/0037513 | A1* | 2/2010 | Petrucci et al. ................. 44/301 |

OTHER PUBLICATIONS

Ensinas, A.V. et al., "Analysis of Process Steam Demand Reduction and Electricity Generation in Sugar and Ethanol Production from Sugarcane", Energy Conversion and Management (2007), vol. 48, pp. 2978-2987.

Huber, G.W. et al., "Synthesis of Transportation Fuels from Biomass, Chemistry, Catalysts, and Engineering", Chemical Reviews, (2006), vol. 106, pp. 4044-4098.

Klemm, D. et al., "Cellulose: Fascinating Biopolymer and Sustainable Raw Material." Angewandte Chemie International Edition, (2005), vol. 44, pp. 3358-3393.

Ribeiro, Nubia M. et al., "The Role of Additives for Diesel and Diesel Blended (Ethanol or Biodiesel) Fuels:", A Review. Energy Fuels, (2007), vol. 21, No. 4, pp. 2433-2445.

Hansen, A.C. et al., "Ethanol-Diesel Fuel Blends a Review", Bioresource Technology (2005), vol. 96, pp. 277-285.

Ma, F. et al., "Biodiesel Production: a Review", Bioresource Technology (1999), vol. 70, pp. 1-15.

Curran, H.J. et al., "Detailed Chemical Kinetic Modeling of Diesel Combustion with Oxygenated Fuels", Conference: 28th International Symposium on Combustion (2000).

Westbrook, C.K. et al., "The Effect of Oxygenate Molecular Structure on Soot Production in Direct-Injection Diesel Engines", Sandia Report Sand, 2003-8207, (2003).

Pepiot_Desjardins, Perrine et al., "Structural Group Analysis for Soot Reduction Tendency of Oxygenated Fuels", Combustion and Flame (2008), vol. 154, pp. 191-205.

Murphy, M. et al., "Compendium of Experimental Cetane Number Data", National Renewable Energy Laboratory, (2004), 50 pages.

Pacheco, M.A. et al., Review of Dimethyl Carbonate (DMC) Manufacture and its Characteristics as a Fuel Additive, Energy and Fuels, (1997), 28 pages.

Almeida, R.M. et al., "Lignocellulosics Conversion in a Molten Salt Hydrate Medium into Platform Chemical/Fuel", Conference Catalysis for Ultra Clean Fuels—Dalian, China, 2008.

Fleche, G. et al., "Isosorbide—Preparation, and Properties and Chemistry", Starch/Starke, vol. 38, (1986), S 26-30.

Malhotra, S.V. et al., "Applications of Corn-Based Chemistry", The Bridge (2007), vol. 37, 6 pages.

Selva, M. et al., "Green Chemistry Metrics: a Comparative Evaluation of Dimethyl Carbonate, Methyl Iodide, Dimethyl Sulfate and Methanol as Methylating Agents", Green Chemistry, (2008), vol. 10, pp. 457-464.

Pietro Tundo et al., "The Chemistry of Dimethyl Carbonate", ACC. Chem. Res., (2002), vol. 35, pp. 706-716.

\* cited by examiner

DIESEL CYCLE FUEL COMPOSITIONS CONTAINING DIANHYDROHEXITOLS AND RELATED PRODUCTS

This application claims priority to Brazilian Application No. PI 0803522-9, filed 17 Sep. 2008, the entire contents of which are hereby incorporated by reference.

FIELD OF THE INVENTION

The present invention relates to the field of fuel compositions for Diesel cycle engines (compression ignition). More specifically, the invention relates to fuel compositions for use in Diesel cycle engines, said compositions being based on dianhydrohexitols-derived oxygenated compounds, mainly isosorbide and derivatives.

Dianhydrohexitols result from the hexitols (alcohols from 6-carbon sugars) double dehydration and can be obtained from renewable sources such as cellulose and sucrose. Dianhydrohexitols and derived products can be employed as cetane improvers, as hydrocarbon substitutes and combined to other oxygenates.

BACKGROUND OF THE INVENTION

Previous to low-cost petroleum exploration, renewable energy sources were utilized. In fact, during the development of the compression ignition engine (U.S. Pat. No. 542,846 and U.S. Pat. No. 608,845) by Rudolph Diesel vegetable oils were utilized, according to the article by Shay, E. G. "Diesel fuel from vegetable oils: Status and opportunities." Biomass and Bioenergy (1993) vol. 4 (4) pp. 227-242.

The concern for the greenhouse effect gases emission resulting from burning fossil fuels makes more relevant the utilization of sustainable sources. Biofuels derived from vegetable biomass, such as ethanol, are currently the only sustainable source of liquid fuel.

The most widely employed fuel is ethanol, which is the fermentation product of sucrose or glucose diluted solutions, according to the equation (1) below: (for glucose).

$$C_6H_{12}O_6 \rightarrow 2CH_3CH_2OH+2CO_2 \quad (1)$$

However, for each 6 carbons present in the glucose molecule, only 4 will actually result in fuel. There is also the need for energy for ethanol distillation: even at optimized conditions, burning of most of the sugarcane bagasse is mandatory, see Ensinas, A. V. et al. Analysis of process steam demand reduction and electricity generation in sugar and ethanol production from sugarcane. Energy Conversion and Management (2007) vol. 48 (11) pp. 2978-2987.

Glucose can also be obtained from the acid or enzymatic hydrolysis of cellulose, according to the article by Huber, G. W. et al., Synthesis of transportation fuels from biomass: Chemistry, catalysts, and engineering. Chemical Reviews (2006) vol. 106 (9) pp. 4044-4098.

Cellulose, the main constituent of biomass, is the most common organic polymer. Its $1.5 \times 10^{12}$ tons per year production makes it a practically inexhaustible raw material, see Klemm, D. et al., Cellulose: Fascinating Biopolymer and Sustainable Raw Material. Angewandte Chemie International Edition (2005) vol. 44 (22) pp. 3358-3393.

Other routes for converting biomass into fuels besides cellulose hydrolysis directed to ethanol production are known. Among those, fast pyrolysis for production of bio-oil and synthesis gas and the utilization of this latter for obtaining fuels. Gasification processes have the drawback of low thermal process efficiency (maximum 16 to 50% of the energy is recovered as fuel after synthesis), as cited by the Huber, G. W. et al, 2006 article.

On the other hand, the utilization of fast pyrolysis bio-oils as fuels is difficult, requiring further refining, still according the same article by Huber, G. W. et al., 2006.

Ethanol, successfully utilized in Otto cycle engines (gasoline), in view of its low cetane number cannot be used directly in Diesel cycle engines. However mixtures of petroleum-derived diesel fuel and ethanol can be successfully utilized provided additives for solubilizing such mixtures are used (surfactants and co-solvents). See in this respect the articles by Ribeiro, Núbia M. et al. "The role of additives for diesel and diesel blended (ethanol or biodiesel) fuels: A review." Energy Fuels (2007) vol. 21 (4) pp. 2433 and Hansen, A. C. et al. "Ethanol-diesel fuel blends—A review." Bioresource Technology (2005) vol. 96 (3) pp. 277-285. In practice, the utilization of ethanol is limited to 20 vol %.

Vegetable oil-derived compounds can be utilized in Diesel cycle engines, chiefly biodiesel, ethyl and methyl esters of fatty acids, see Ma, F. et al., Biodiesel production: A review. Bioresource Technology (1999) vol. 70 (1) pp. 1-15. However, the availability of vegetable oils is reduced when compared to that of cellulose.

Burning of oxygenated compounds-containing fuels such as ethanol, biodiesel and others in Diesel cycle engines has the advantage of reducing soot emission. See the articles by Curran, H. J. et al. "Detailed Chemical Kinetic Modeling of Diesel Combustion with Oxygenated Fuels." Conference: 28th International Symposium on Combustion (2000); Westbrook, C. K. et al. "The effect of oxygenate molecular structure on soot production in direct-injection diesel engines." SANDIA REPORT SAND2003-8207 (2003); and Pepiot-Desjardins, Perrine et al. "Structural group analysis for soot reduction tendency of oxygenated fuels." Combustion and Flame (2008) vol. 154 (1-2) pp. 191-205.

A further important parameter in Diesel cycle engine fuels is the post compression ignition ability, expressed by the cetane number obtained in an engine, ASTM D613 Method, or in an equipment such as the IQT Ignition Quality Test, ASTM D6890, in this respect see Murphy, M. et al.—Compendium of Experimental Cetane Number Data. National Renewable Energy Laboratory (2004).

U.S. Pat. No. 2,575,543 reports the use of diethyl ether (DEE) which can be obtained from renewable sources (ethanol) in Diesel cycle engines, as start fuel. Mixtures from 15 to 50% by volume of DEE could be utilized in the fuel. The drawback of DEE is its low boiling point (34.6° C.) and specific weight (0.7134 g/cm$^3$) in spite of the high cetane number (140-160, reported in the literature, see the above citation by Murphy, M. et al. (2004)).

U.S. Pat. No. 4,425,136 teaches the direct use of carbohydrates in furnaces, as solutions of water, ethanol and sucrose or any other soluble sugar. Water and ethanol are required respectively for solubilizing sugar and for starting the engine (volatile). $C_5$ to $C_{12}$ sugars are exemplified, including glucose. The drawback is that sugars tend to caramelize and form deposits in the engines, even at the more elevated combustion temperatures required for the invention (500° C.). This patent further teaches that the invention could be utilized in admixtures with diesel oil provided modifications in the engine are performed.

U.S. Pat. No. 4,891,049 teaches the use of carbonates as additives for Diesel cycle engine fuel. Fuels with up to 50 mass % carbonate are claimed, such as dimethyl carbonate (DMC).

In spite of the possibility of being obtained from regenerable sources, the cetane number of DMC is low, and its preferred use is as an additive in gasoline, see Pacheco, M. A. et al. Review of Dimethyl Carbonate (DMC) Manufacture and Its Characteristics as a Fuel Additive. Energy & Fuels (1997).

U.S. Pat. No. 5,308,365 relates to the utilization of diethers or triethers of glycerol as Diesel cycle engines additive in amounts up to 30 volume % in the fuel. It could be observed that the soot content was reduced. Glycerol can be considered as a renewable source, it being the by-product of the transesterification of fatty acids with alcohols (biodiesel production). However, as compared to the availability of other materials such as cellulose, the utilization potential of glycerol ethers as the fuel main constituent is reduced.

U.S. Pat. No. 6,015,440 teaches the use of glycerol ethers combined to biodiesel (fatty acid esters), resulting in lower cloud point in the biodiesel.

U.S. Pat. No. 5,820,640 describes the utilization of emulsions, mixtures of fast pyrolysis oil (bio-oil), up to 50% by weight, with diesel oil. The use of an emulsifier is required for solvency of the bio-oil into the diesel fuel. In spite of the production potential of huge amounts of bio-oil by fast pyrolysis, there are problems such as corrosion, ash content and sediments in the material. The use of the mixture in a diesel engine has not been evaluated in the patent.

U.S. Pat. No. 5,858,030 claims the use of dimethoxyalkanes such as dimethoxyethane (DMET) as additives for diesel oil. The cetane number of 1,2-dimethoxyethane is 105, and it can be produced in renewable form (oxidative coupling of the dimethyl ether, which can be obtained from synthesis gas) but has low flash point (0° C.).

U.S. Pat. No. 6,578,870 teaches the use of an oxygenated compound such as DMET to obtain a desired increase in the cetane number and a second oxygenate of higher flash point to obtain the desired flash point of the mixture.

U.S. Pat. Nos. 5,906,664 and 6,270,541 teach the use of dimethyl ether (DME) as fuel in Diesel cycle engines. Compositions of methyl alcohol, water and DME are claimed with a single-phase product with good ignition features. DME can be produced renewably (biomass, synthesis gas) but has the disadvantage of low flash point (−41° C.).

U.S. Pat. Nos. 6,872,231 and 7,300,476 teach the use of heavy oxygenates as Diesel additives, without the disadvantage of the low flash point. However those are obtained from the oxidation of fossil hydrocarbons.

U.S. Pat. Nos. 7,282,071 and 7,374,587 teach the use of hydrophobic starch as fuel, including diesel engines. Starch, in spite of being renewable, is obtained in lower profusion than cellulose, and is useful to other ends such as human food. Also, it is not completely dissolved in diesel fuel, which can impair combustion.

U.S. Pat. No. 7,014,668 teaches the use of a fuel for engines including those of the Diesel cycle, of a mixture of oxygenates from 5% to 100% by volume, and optionally hydrocarbons. The fuel of the invention has at least two distinct oxygenates, with a total of 4 functional groups in the mixture comprising the alcohol, ether, ester, ether nitrate, aldehyde, ketone, acetal, peroxide and epoxide. More preferably, the fuel would have at least one compound of each group described above.

U.S. Pat. No. 4,992,605 relates to the hydroconversion of vegetable oils on hydrotreating catalysts, leading to high cetane paraffin compounds corresponding to the fatty acids of the original triglycerides.

U.S. published Application 2006/0186020 teaches the hydroconversion of triglycerides in reactors for diesel HDT, admixed in the amount of up to 75 mass % of the feed, yielding the high cetane paraffin compounds already admixed to the diesel stream specified for use as fuel.

U.S. Pat. No. 7,279,018 relates to the hydrogenation of the same triglycerides, with further isomerization in order to reduce the cloud point of the product. The product from hydrogenation and isomerization is then admixed to diesel and optionally to another oxygenate. The drawback of these processes is that the availability of vegetable oils and animal fats (triglycerides) is not as high as that of cellulose.

U.S. published Application 2006/0096158 teaches the use of a cyclic ester or lactone for compounding gasoline or diesel fuel. The use as gasoline is preferred, since simple lactones, without long chains linked to the cycle, have high octane rate. A lactone such as γ-Valerolactone can be obtained from levulinic acid, which can be obtained from hydroxymethyl furfural, which in turn can be obtained from cellulose.

Other patents teach the production of non-oxygenated products from renewable sources such as terpenoids or isoprenoids (synthetic derivatives of isoprene).

U.S. Pat. No. 7,029,506 teaches the use of terpenes such as β-carotene and the like (carotenoids, carotene precursors) as additives for diesel fuel, in small amounts). The compounds can be extracted from plants such as broad beans (*vicia faba*) and certain seaweeds. The amount of carotene obtained from biomass is small.

U.S. published Application 2008/0083158 teaches the genetic modification of microorganisms for producing the farnesane isoprenoid and derivatives as well as the use of such compounds as additives for diesel fuel compounding. Farnesane is produced by cell cultivation, consuming sugars. Sugars are consumed by the development of biomass, generating the isoprenoid in small amount.

The multiplicity of patents directed to the preparation of renewable fuels for Diesel cycle engines demonstrates that the art still needs new products, of better ignition quality and obtained from biomass at a higher output. Broadly, the products have poor compatibility with petroleum-derived diesel fuel and are of low ignition ability (e.g. ethyl alcohol), or obtained from sources other than cellulose (e.g. biodiesel) or are obtained through extended series of operations which entail yield loss (e.g. products from synthesis gas, this latter being obtained from biomass gasification). The documents cited above relate to the use of renewable oxygenated compounds as main components of Diesel cycle engine fuels.

An additional possibility for use of renewable compounds is their application as ignition improvers. Usually nitrated compounds are utilized as cetane improvers, mainly 2-ethyl-hexyl-nitrate. Such compounds are usually derived of alcohols submitted to sulfonitric solutions ($H_2SO_4+HNO_3$) or other nitration methods known in the art.

U.S. Pat. No. 2,066,506 teaches the use of nitrates of polyhydric alcohol derivatives, such as 1,2-propyleneglycol dinitrate. U.S. Pat. No. 2,378,466 teaches the use of the dinitrate of a poly(1,2-alkylene glycol) as cetane improver.

U.S. Pat. No. 2,280,217 teaches that light alkyl nitrates, such as ethyl nitrate (produced by the nitration of ethyl alcohol) can lead to flash point problems, heavy nitrates being preferred, with alkyl groups of more than 5, preferably more than 6, carbon atoms.

U.S. Pat. Nos. 4,405,335 and 4,406,665 relate respectively to the use of tetrahydrofurandiol dinitrate and of the tetrahydrofuranol nitrate as cetane improvers.

U.S. Pat. No. 4,659,335 teaches the use of nitric acid esters of monosaccharides and/or polysaccharides, preferably nitrocellulose, plus a polyether as cetane improvers.

U.S. Pat. No. 4,705,534 relates to the use of several polynitrates (polynitrates esters) plus selected amines (as stabilizers) for increased cetane in diesel and alcohol fuels. As polynitrates are cited ethylene glycol dinitrate, triethylene glycol dinitrate, nitroglycerin, cellulose tri-, di- and mononitrate and admixtures of same, among others. Nitrocellulose is sparingly soluble in hydrocarbons and its viscosity is high.

U.S. Pat. No. 5,096,462 relates to the use of nitric acid for dissolution of biomass cellulose, the resulting stream being then submitted to reaction with ethylene oxide (with alkylation of a few cellulose —OH groups, a reaction known as ethoxylation), and later the addition of a dehydrating agent such as $H_2SO_4$, plus $HNO_3$, which eventually leads to nitration of the product. The nitrated product is then incorporated to an alcohol such as methanol or ethanol to be utilized in Diesel cycle engines. The utilization of this product as cetane additive in admixture with hydrocarbons is not claimed.

U.S. Pat. No. 5,454,842 deals with the use as cetane improver of the products of the nitration of fatty acids alcohols. Claimed contents for utilization in diesel fuel are from 0.01% to 2% by mass.

A further possibility of obtaining useful products straight from cellulose and/or sucrose involves the use of dianhydrohexitols. The dianhydrohexitols can be produced in the initial hydrolysis step, hexoses hydrogenation (glucose in case of cellulose or starch, and glucose plus fructose in case of sucrose) to hexitols (glucitol or sorbitol in case of D-glucose, and sorbitol plus mannitol in case of fructose) and further double dehydration, resulting in dianhydrohexitols (isosorbide or 1,4:3,6-Dianhydro-D-glucitol in case of sorbitol and isomannide or 1,4:3,6-Dianhydro-D-mannitol from mannitol), of formula $C_6H_{10}O_4$.

Dianhydrohexitols are represented by the general structure (describing isosorbide, isomannide and isoidide isomers) illustrated by Formula 1 below.

Formula 1

The preparation of dianhydrohexitols by conversion of cellulose biomass can be advantageous if compared to the preparation of ethanol, since all the carbons present in cellulose (and sucrose) are converted into the end product. Further, separation schemes not involving distillation can be employed with significant energetic efficiency. A selective process for obtaining isosorbide from cellulose using hydrated molten salts is known. In this respect see the article by Almeida, R. M. et al., Lignocellulosics Conversion in a Molten Salt Hydrate Medium into Platform Chemical/Fuel—Conference Catalysis for Ultra Clean Fuels—Dalian, China, 21-24 Julho 2008.

Dianhydrohexitols such as isosorbide have been utilized as PVC plasticizer and renewable monomer. Derivatives such as isosorbide mononitrate and dinitrate are used in the treatment of myocardial infarction. See in this respect the article by Flèche, G.; Huchette, M., Isosorbide—preparation, properties and chemistry. Starch/Stärke, vol. 38, n 1, (1986), S 0.26-30.

Most of the processes for hexitols dehydration are not selective. The acidic medium process of sorbitol (glucitol) dehydration leads to the initial formation of 1,4 and 2,5 anhydro-D-glucitol—both compounds being known as sorbitan.

In the sequence, 1,4 anhydro-D-glucitol can be dehydrated into 1,4-3,6 dianhydro-D-glucitol (isosorbide). 2,5 anhydro-D-glucitol on its turn does not undergo the second dehydration.

The mixture containing preferably the products of the first sorbitol dehydration is called sorbitan and is easily esterified with fatty acids. U.S. Pat. No. 4,297,290 describes a process for obtaining sorbitan esters. Sorbitan esters, used as surfactants, are commercially available from several manufacturers: see Ullmann's Encyclopaedia of Industrial Chemistry 2002, Wiley-Surfactants/Nonionic Surfactants. DOI: 10.1002/14356007.a25-747.

According to the teachings of U.S. Pat. No. 4,477,258, sorbitan esters are utilized in formulations of diesel fuel-containing emulsions. Contents from 97 to 90% by volume of diesel fuel are admixed to an aqueous solution of ethanol and/or methanol of at least 5% of the total, and from 3 to 10% by volume of an emulsifying mixture containing sorbitan monooleate and an ethoxylated non-ionic surfactant.

U.S. Pat. No. 4,604,102 cites the utilization of an additive pack for Diesel cycle engines containing (i) a combustion accelerator (organic nitrate) and (ii) sorbitan esters, reducing coking in the fuel injection nozzles. Preferably the amount of the mixture of (i) and (ii) in the fuel is from 0.01 to 1% by mass.

U.S. Pat. No. 6,156,081 teaches the formulation of a further additive pack for corrosion inhibition and ease of combustion, containing a surfactant agent—a sorbitan ester, lubricant oil and a saturated hydrocarbon containing from 14 to 17 carbons is claimed. The claimed ratio of diesel fuel for the additive pack is from 1:200 to 1:2,000.

U.S. Pat. No. 6,527,816 teaches the utilization of isosorbide-derived compounds as detergents for lowering deposits in gasoline. The compounds are obtained from the reaction of isosorbide with epoxide-containing groups. Reported contents in the Examples are of 400 mg of the compound/L gasoline.

U.S. Pat. No. 6,648,929 and U.S. Pat. No. 6,858,046 (continuation) teach water-emulsified fuel compositions containing sorbitan esters as one of the components of the claimed additive pack.

U.S. Pat. No. 7,182,797 teaches the utilization of a pack of additives for diesel fuel containing sorbitan oleate, a polyoxyethylene alcohol, an alkylene glycol and an amine.

An alkyl ether of isosorbide, dimethyl isosorbide, is utilized as component of personal care products and in drug formulations, see the article by Malhotra, S. V. et al. Applications of Corn-Based Chemistry. The Bridge (2007) vol. 37 (4).

Processes for the production of dimethyl isosorbide are known in the art, such as in International Application WO 2007/096511, where isosorbide is treated with methyl chloride in the presence of an alkaline agent.

U.S. Pat. No. 4,585,649 teaches dentifrice formulations (which include tooth paste, mouth wash, chewing gum, tooth sticks and dental floss) containing monoethers and diethers of dianhydrohexitols. The monoethers and diethers of isosorbide were effective to reduce the multiplication of plaque-causing bacteria.

The state-of-the-art illustrates the multiplicity of solutions presented for obtaining renewable fuels for Diesel cycle engines. However a fuel other than ethanol derived from cellulose is still sought, said fuel showing solubility in diesel, combustion ability (high cetane), which could be obtained in high yields and utilized in significant amounts in petroleum derived diesel fuel.

Thus, there is still the need in the technique of compositions for use in Diesel cycle engines based on dianhydrohexitols having the desired features of high specific mass, flash point, oxygen content, boiling point and combustion ability which enable their use. Still, as a particular case, the use of dianhydrohexitols dinitrates is claimed in the present application as combustion accelerators.

Also needed in the technique, oxygenates from renewable sources which can be utilized as components of a Diesel cycle engine, in any amount, such compounds being described and claimed in the present application.

SUMMARY OF THE INVENTION

Broadly, the invention relates to a formulation of Diesel cycle engine fuel comprising at least one dianhydrohexitol or related product of Formula 2 below:

Formula 2 wherein R' and R" are selected among —H, hydrocarbyl and —NO$_2$.

DETAILED DESCRIPTION OF THE INVENTION

The present invention is directed to the use of dianhydrohexitols and related products as fuels for Diesel cycle engines. More specifically, the dianhydrohexitols and related products can be present in the fuel in a small amount, such as 0.05 mass %, or they may constitute the whole amount of the fuel.

The dianhydrohexitols or related products of the present invention are represented by the Formula 2 below:

Formula 2 wherein R' and R" are selected among —H (dianhydrohexitols), hydrocarbyls such as the mono- and dialkyl dianhydrohexitols and —NO$_2$, forming the dianhydrohexitols mono- or dinitrate.

Dianhydrohexitols can be obtained from carbohydrates including polysaccharides such as cellulose and starch, disaccharides such as sucrose, and monosaccharides such as galactose among others. Preferably they are obtained from starch, cellulose or sucrose. More preferably, they are obtained from cellulose and/or sucrose.

Cellulose and starch are polymers of the D-glucose monosaccharide (for the sake of brevity only dextrogerous monosaccharides, considered of natural occurrence, have been considered, whereby in the present specification glucose means D-glucose and hexitols is D-hexitols). Sucrose is a disaccharide made up of one fructose and one glucose molecule. Cellulose, starch and sucrose can be hydrolyzed to the corresponding monosaccharides.

Both glucose and fructose can be hydrogenated into the sugar alcohol or corresponding hexitol. The hexitol produced by the hydrogenation of glucose is sorbitol, while the hydrogenation of fructose leads to a mixture of sorbitol and mannitol. Iditol is produced by the hydrogenation of galactose, an hexose.

The hexitols: sorbitol, mannitol or iditol can on their turn be dehydrated to anhydrohexitols and again dehydrated to dianhydrohexitols.

The dianhydrohexitols isosorbide, isomannide and isoidide stereoisomers are, represented by, respectively, Formulas 1a, 1b and 1c:

Formula 1a

Formula 1b

Formula 1c

One of the preferred methods for preparing dianhydrohexitols is that described in the above-cited article by Almeida, R. M. et al., 2008. The method consists in the dissolution of cellulose and/or sucrose in the solution of a hydrated molten salt and an acid such as ZnCl$_2$ and HCl, whereby are obtained hydrolysis products (monosaccharides), which after withdrawal of the acid the hexoses are hydrogenated to hexitols in the molten salt medium. At a higher temperature the double dehydration of the hexitols molecules to dianhydrohexitols occurs, and the dianhydrohexitols products are then recovered.

The method employed for obtaining dianhydrohexitols is not and should not be construed as a limiting factor of the invention, it being directed to fuel compositions of the Diesel cycle containing dianhydrohexitols and related products. Different production methods for obtaining dianhydrohexitols can be employed.

Besides the dianhydrohexitols themselves, hydrocarbyl ethers and nitrates of these compounds can also be utilized as fuels for Diesel cycle engines.

Hydrocarbyl ethers can have as substituent R' and R" groups including alkyl or cycloalkyls or phenyls. Still, just one of the R' and R" can be substituted, H being one of these groups. The size of the alkyl chain can be equal to 1 (methyl), 2 (ethyl) or higher than 2. In practice, limitations of the chain size are restricted to the desired fuel properties—a too long size would result in high boiling point temperature and high cloud point. Still, R' and R" groups can be both alkyl, of the same size or of different size.

In practice, the size of the substituent hydrocarbyl groups cannot be considered as limiting the invention, where the novelty consists in the utilization of hydrocarbyl ethers of dianhydrohexitols as fuel compositions for Diesel cycle engines.

Besides the hydrocarbyl ethers of dianhydrohexitols, the invention also considers fuel compositions for Diesel cycle engines which comprise nitric ethers of dianhydrohexitols, exemplified by the dianhydrohexitols dinitrates, such as isosorbide dinitrate (ISDN). Besides the dinitrates the dianhydrohexitols mononitrates can be utilized as well or still mixtures of mononitrates and dinitrates.

The preferred compound of the present invention for the fuel compositions for Diesel cycle engine is the isosorbide dimethyl ether, or dimethyl isosorbide (DMI), according to Formula 3 below:

Formula 3

Dimethyl isosorbide has the formula $C_8H_{14}O_4$, boiling point from 234 to 242° C., oxygen content 36.74% and specific mass 1.16 at 20/4° C. The flash point is 118° C. and the freezing point is lower than −57° C.

A further component which can be utilized in compositions for Diesel cycle engines is isosorbide itself. Isosorbide has the formula $C_6H_{10}O_4$, oxygen content 43.79% and specific mass 1.377 at 20/4° C. and high boiling point, above 270° C. However the melting point is 72° C.—which requires the addition of water or another solvent to obtain a soluble mixture in ambient conditions, or have a heated fuel injection system. The cloud point of a mixture by mass of 80% isosorbide, 10% water and 10% de ethanol is −15° C. Besides water and ethanol, another dianhydrohexitol derived compound, such as dimethyl isosorbide, can be a solvent for isosorbide.

In spite of the high isosorbide boiling point, the oxygen content in the molecules is rather high. Thus, formation of soot precursors upon burning is impaired. Still, the molecule is stable at elevated temperatures contrary to other oxygenates directly derived from cellulose, such as glucose, which tends to degrade when submitted to temperatures higher than 185° C. When use is made of polysaccharides directly as fuel (see U.S. Pat. No. 4,425,136), besides special injection systems, the engine should be kept at a temperature of at least 500° C. to avoid caramelization and deposit formation. Temperatures higher than those typically found in injection systems and Diesel cycle engines are not required in the present invention.

The hydrocarbyl-derived compounds of dianhydrohexitols are the preferred molecules for the practice of the present invention for utilization as main component of fuel compositions for Diesel cycle engines. By main component it is meant that the mass content of the derived compound is at least 10 mass %, preferably 25 mass %, more preferably higher than 50 mass %.

Dianhydrohexitols nitrates (nitric ethers) are preferably utilized in small amounts, not more than 10 mass %, which characterizes their use as an additive instead of main component.

The preferred dianhydrohexitol dinitrate claimed in the invention is the isosorbide dinitrate. Preferably, when dianhydrohexitols nitrates are employed, the concentration is from 0.01 to 5 mass %, preferably from 0.05 to 2 mass %.

Dianhydrohexitols nitrates can be employed as sole cellulose-derived components in the mixture, or be employed in admixture with other dianhydrohexitols and related products. A particular claim is the utilization of isosorbide dinitrate in admixture with petroleum-derived diesel fuel. The Examples illustrate the present invention, that dianhydrohexitols dinitrates can be utilized as ignition improvers, increasing cetane (determined by IQT, ASTM Method D6890) number of the fuel.

It has now been discovered that the utilization of compounds such as isosorbide dinitrate is advantageous relative to conventional cetane improvers, monoalcohols nitrates, such as 2-ethyl nitrate, and that it is soluble in typical hydrocarbons. Surprisingly, while such conventional cetane improvers cannot be employed in higher amounts in mixtures of a more polar nature, such as the isosorbide, ethanol and water solution, the dianhydrohexitols nitrates of the present invention are completely soluble in a hydrocarbon medium. Thus, the present invention claims the use of Diesel cycle engine fuels containing the dianhydrohexitols nitrates combined to dianhydrohexitols and/or hydrocarbyl ethers of dianhydrohexitols.

A preferred claim of the invention is the use of the isosorbide dinitrate additive combined to dimethyl isosorbide as fuel composition for use in Diesel cycle engines. It was surprisingly found that the cetane improvement for a certain dinitrate isosorbide mass is significantly higher in the ignition of dimethyl isosorbide than in the ignition of state-of-the-art petroleum-derived diesel fuel.

Several state-of-the-art methods for obtaining dianhydrohexitols are known, those being informed just for the sake of indicating the production viability of dianhydrohexitols-derived compounds of the present invention as components of Diesel cycle engine fuels. Basically, these methods involve the protection of the two hydroxyl (alcohol) groups present in the dianhydrohexitols.

Several methods are know for the methylation of alcohols, including diols, and can be utilized for producing dimethyl dianhydrohexitols such as dimethyl isosorbide. See the article by Selva, M. and A. Perosa: "Green chemistry metrics: A comparative evaluation of dimethyl carbonate, methyl iodide, dimethyl sulfate and methanol as methylating agents." Green Chemistry (2008) vol. 10 (4) pp. 457-464 2/32 where it is cited the use of dimethyl carbonate, methyl iodide, dimethyl sulfate and methanol as methylation agents.

In view of its features of easy synthesis and methylation ability, the use of dimethyl carbonate, such as reported by Tundo, P. et al. "The Chemistry of Dimethyl Carbonate." Acc. Chem. Res. (2002) vol. 35 (9) pp. 706-716 can be a preferred method for obtaining dimethyl isosorbide. Since besides the methyl product the methylation by-product is one methanol, production can be total, in part or not be removed from the product, such as the dimethyl isosorbide. Thus, the mixture of dimethyl isosorbide and methanol can be utilized as diesel fuel component.

Several methods are known in the art for the alkylation of alcohols with olefins, generating alkyl ethers of the original alcohols, and which can be employed for producing alkyl and dialkyl dianhydrohexitols, such as diethyl isosorbide. Ethene for producing diethyl isosorbide can have origin in petroleum or either is from renewable sources, such as ethanol dehydration. FCC naphtha is another possible source of olefins which can be utilized for alkylating dianhydrohexitols.

Several methods are known in the art for the arylation of alcohols with aromatics, and can be utilized for generating aryl or diaryl ethers of dianhydrohexitols such as diphenyl isosorbide.

For obtaining dianhydrohexitols nitrates, the usual method is nitration with the aid of sulfonitric solution using $HNO_3$ as reagent and $H_2SO_4$ as dehydrating agent. Other methods are known in the art such as the use of nitrogen pentoxide.

It should be understood by the experts in the field that the methods herein reported for obtaining dianhydrohexitols-derived compounds are not and should not be construed as being limiting factors of the invention, which is directed to fuel compositions comprising the dianhydrohexitols and related products. Other methods for obtaining the dianhydrohexitols and related products starting from dianhydrohexitols can be employed as well, the same useful compounds of the invention being obtained. Therefore, the methods herein described are cited exclusively for the sake of illustration.

According to the procedure used for obtaining dianhydrohexitols, non-reacted anhydrohexitols can be present in the product composition and in the diesel fuel, their higher molecular weight and larger amount of free hydroxyls impairing their utilization for components of Diesel cycle engines. The higher amount of free hydroxyls in anhydrohexitols also should disadvantage the preparation of hydrocarbyl-derived compounds, since they should increase consumption of protection agents (etherification, methylation, alkylation) of the free hydroxyls.

Sorbitan esters containing isosorbide esters can also be present in diesel fuel. The use of such compounds as surfactant agents including in admixtures of diesel and ethanol and methanol is known in the art.

Other surfactant agents known in the art can be present together with the dianhydrohexitols and related products used in the Diesel cycle engine fuel composition of the invention.

Besides the sorbitan esters anionic emulsifiers such as carboxylic acids, cationic emulsifiers such as amine salts, and also non-ionic, amphoteric, nitrogen bases, etc. are also known in the art as emulsifiers. Biodiesel itself, preferably prepared from castor beans, can be utilized as surfactant agent and co-solvent. U.S. Pat. No. 3,490,237 describes several surfactant agents which can be utilized together with the Diesel cycle engine fuel containing dianhydrohexitols-derived compounds of the present invention.

Besides the utilization of pure dianhydrohexitols-derived compounds, such as dimethyl isosorbide, the present invention refers to the mixture of petroleum-derived diesel fuel and the dianhydrohexitols-derived compounds. The solubility of dianhydrohexitols-derived compounds such as dimethyl isosorbide can be lower than 50 mass % in typical petroleum-derived diesel fuel streams. Thus, the utilization of an amount of co-solvent or surfactant agent such as biodiesel, making up preferably less than 20% and more preferably less than 10 mass % of the final diesel fuel can be relevant. Such problem is lessened when alkyl chains larger than the methyl ($C_1$) are used, and co-solvent addition can be dispensed with.

This drawback can be avoided by utilizing formulations of mixture of diesel fuel and dianhydrohexitols-derived compounds lower than 50% in the case of dimethyl isosorbide, or lower than the composition where the formation of two phases occur, in case of other dianhydrohexitols-derived compounds.

However, this depends on the process of feeding the load in the engine. In case of availability of a dianhydrohexitols-derived compound stream free from hydrocarbons for feeding the fuel tank, undesired insolubilization can occur in case said tank would already hold a previous amount of hydrocarbon.

Thus, four cases are claimed in the present invention for avoiding the problem of dianhydrohexitols and related compounds distribution as fuels in a Diesel cycle engine:

(i) the dianhydrohexitols and/or dianhydrohexitols related compounds contain an additive pack (co-solvent as biodiesel and/or another surfactant agent);
(ii) the diesel fuel already contains a surfactant or co-solvent such as biodiesel;
(iii) the dianhydrohexitols and/or dianhydrohexitols-derived compounds are already distributed with the diesel fuel, so that the mixture with further diesel fuel always results in amount of dianhydrohexitols and/or dianhydrohexitols-derived compounds lower than the saturation amount from which phase separation occurs;
(iv) the dianhydrohexitols and/or dianhydrohexitols-derived compounds are distributed with diesel fuel and further surfactant agent or co-solvent.

The co-solvents and/or surfactant agents which are employed can be selected from those known in the art, or even be derived from anhydro- and dianhydrohexitols such as sorbitan esters. Biodiesel, fatty acids methyl or ethyl esters obtained from vegetable oils by transesterification can be utilized as co-solvents. The preferred biodiesel is that from castor beans, since it contains hydroxyl in the fatty acid chain (ricinoleic acid).

A further difference of the present invention as compared to the state-of-the-art cellulose renewable fuel, ethanol, is that in case phase separation occurs and alkyl dianhydrohexitols such as dimethyl isosorbide are being utilized, the more polar phase (DMI) has already sufficient cetane for utilization of the product as diesel. Thus, the impact would be lower than with ethanol (the engine would stop working due to low ignition ability of ethanol).

Thus, a further distribution case besides the one described below can be made possible: distribution of dianhydrohexitols-derived compounds as sole component of the dianhydrohexitols fuel.

An additional possible case is the admixture of dianhydrohexitols and related products and optionally ethanol and water.

This mixture can still contain biodiesel and petroleum-derived diesel fuel, in which case ethanol and water will be in lower amounts relative to the other mixture components. See in this respect the composition of Example 7.

The hydrocarbyl-derived dianhydrohexitols compounds are able to solubilize a certain amount of water. In case of dimethyl isosorbide they are able to form solutions with water in any amount. Thus, water can be added to improve fuel savings and lower the temperature of the Diesel cycle engine, this entailing as is known diminished emission of combustion NOx.

Another important gain of the cellulose-derived compounds such as the dianhydrohexitols-derived compounds is the oxygen increase in the Diesel cycle engine fuels of the present invention. It is known that the presence of oxygen in the fuel above certain level inhibits soot formation. Renewable source oxygenates, employed in Diesel cycle engines, such as ethanol, usually have low specific mass, and consequently low energetic density. Dimethyl isosorbide specific mass at 20/4° C. is 1.16, against 0.7915 of anhydrous ethanol, and its energetic content is 28 MJ/L, against just 22 MJ/L of ethanol, in spite of the fact that the DMI (36.74 mass %) oxygen content is higher than that of ethanol (34.73 mass %). Besides, DMI cetane by IQT is 51.77, while that of ethanol is just 8.

Even isosorbide has higher energetic content: specific mass 20/4° C. 1.377, oxygen content 43.79 mass % and energetic content 27.6 MJ/L.

Thus, the gain resulting from the present invention is significant: utilization as Diesel cycle fuel of cellulose-derived oxygenates of higher density, higher oxygen content, higher energetic density than ethanol, increased affinity for hydrocarbons, besides higher cetane number.

The process for preparing the fuel compositions of the invention is by mere mixture of the dianhydrohexitols and related compounds with hydrocarbon diesel fuel, biodiesel, ethanol or water, under agitation or not. In case phase separation occurs, surfactants or co-solvents can be added as described hereinbefore in the present specification.

The invention will now be described by the following Examples, which should not be construed as limiting same.

EXAMPLE 1

This Example is a Control Example.

The effect of the cetane improver more commonly employed, 2-ethyl-(hexyl-nitrate (2EHN) has been determined on a typical hydrotreated petroleum-derived diesel fuel.

Diesel fuel density at 20/4° C. was 0.8798, sulfur content 154 ppm and analysis by gas chromatography coupled to mass spectrometry (GC/MS) indicated composition 16.5 mass % paraffins, 40.6 mass % naphthenic compounds, 27.6 mass % monoaromatics, 12.2 mass % diaromatics and 2 mass % triaromatics.

Several 2EHN contents were added to the hydrotreated diesel fuel of the Example and the ignition delay expressed as estimated cetane or IQT was determined by the IQT (Ignition Quality Tester) ASTM Method D6890.

Table 1 lists the diesel fuel IQT values and those of mixtures of diesel fuel and 2EHN.

TABLE 1

| 2EHN content, mass % | cetane IQT |
|---|---|
| 0 | 39.77 |
| 0.05 | 41.68 |
| 0.1 | 45.59 |
| 0.5 | 47.37 |

A typical increase in 2 cetane numbers for 500 ppm 2EHN was observed.

EXAMPLE 2

This Example illustrates the preparation and utilization of isosorbide dinitrate (ISDN) as a combustion improver additive in diesel fuel compositions.

A sulfonitric solution was prepared containing 100 mL $H_2SO_4$ 98% and 70 mL $HNO_3$ 68%. The mixture was kept under agitation in a bath cooled at 0° C., 160 g trichloromethane being added as well. An isosorbide solution, 25 g dissolved in 6.5 g water was added dropwise so that the temperature would not go above 8° C.

After 30 minutes the mixture was added to 300 g ice. The organic phase was separated, washed with sodium bicarbonate solution for removal of the dissolved acid and the solvent removed in a rotary evaporator. Nearly 32 g product was recovered. The sample was cooled resulting in crystallization. Elementary analysis of the material indicated C=30.77% H=3.41% O=53.97% N=11.77%. The isosorbide dinitrate formula (ISDN) is $C_6H_8O_8N_2$, which equals to 30.52% C, 3.41% H, 54.20% O and 11.86% N. The comparison shows that ISDN was obtained at a fairly good purity degree.

Several ISDN contents were added to the hydrotreated diesel fuel of Example 1. ISDN was soluble in the diesel fuel in all the amounts employed.

The delay in the ignition of the IDSN and diesel fuel mixtures is listed in Table 2 below.

TABLE 2

| ISDN content mass % | cetane IQT |
|---|---|
| 0 | 39.77 |
| 0.1 | 42.54 |
| 0.5 | 46.72 |
| 1.0 | 47.45 |

Figure 1:
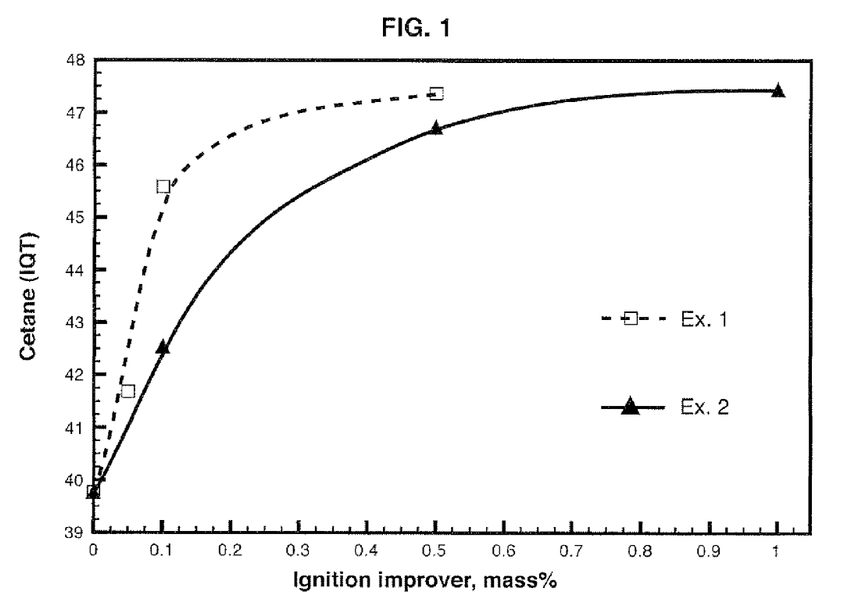
FIG. 1 is a graph which illustrates the utilization of isosorbide dinitrate (ISDN) as diesel ignition improver according to Examples 1 and 2.

Data for utilization of 2EHN and ISDN as combustion improvers are shown in FIG. 1. At high contents (0.5%) the cetane gain is similar. Data show that nitrated isosorbide can be utilized as combustion improver.

EXAMPLE 3

This Example shows the utilization of isosorbide as fuel in a Diesel cycle engine.

Dissolution of isosorbide in water and ethanol was obtained. The amount was 80 mass % isosorbide, 10 mass % ethanol and 10 mass % water. Isosorbide dinitrate was added to the mixture of isosorbide, ethanol and water. IQT analysis data for mixtures with ISDN are listed in Table 3.

The 2EHN combustion improver was also utilized, at treat rates of 0.1 mass %, 0.5 mass % and 2 mass %. For the 0.5 mass % and 2 mass % rates there was phase separation (indicated by turbidity in the mixture and later formation of a non polar phase at the top, compatible with the 2EHN volume added).

The IQT analysis of the isosorbide, ethanol and water mixture at 0.5 mass % 2EHN was 10.32.

TABLE 3

| ISDN content, mass % | cetane IQT |
|---|---|
| 0 | 9.69 |
| 0.1 | 10.67 |
| 0.5 | 10.89 |
| 1.0 | 11.42 |
| 2.0 | 12.13 |
| 5.0 | 16.75 |

Example 3 shows that the 2EHN combustion improver usually employed in the art is not suitable for a more polar character fuel mixture.

EXAMPLE 4

This Example illustrates the use of dimethylisosorbide (DMI) as combustion improver in a polar character fuel.

The isosorbide methylation product dimethyl isosorbide (DMI) was added to the mixture of Example 3 in the amount of 50% by mass. Thus, the resulting mixture presented 50% DMI, 40% isosorbide, 5% water and 5% ethanol. To this mixture were still added different ISDN contents.

IQT data are listed in Table 4 below.

TABLE 4

| ISDN content, mass % | cetane IQT |
|---|---|
| 0 | 22.72 |
| 0.5 | 23.59 |
| 2.0 | 26.13 |

The specific mass of dimethyl isosorbide (DMI) at 20/4° C. is 1.16, its flash point is 118° C., boiling point is from 234 to 242° C. and the freezing point is lower than −57° C.

Figure 2:
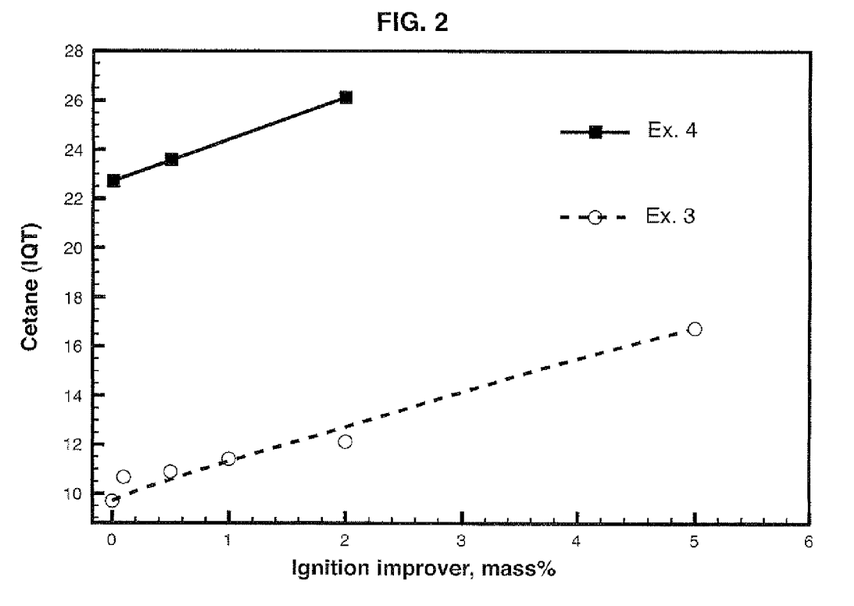
FIG. 2 is a graph which illustrates mixtures of isosorbide, ethanol and water and optionally in admixture with dimethyl isosorbide (DMI) as Diesel cycle engine fuel, and the effect of ISDN on the ignition of said mixtures according to Examples 3 and 4.

FIG. 2 shows the data for Examples 3 and 4. Cetane number for the mixture isosorbide, ethanol and water as determined by IQT is low and slightly increases by ISDN addition. DMI addition to the mixture improved initial cetane number and even the response to ISDN.

EXAMPLE 5

Isosorbide dimethyl ether (DMI) was admixed at various treat rates to the mixture of isosorbide, ethanol and water of Example 3. IQT data for this mixture and for pure DMI without ISDN addition are listed in Table 5 below.

TABLE 5

| DMI content, mass % | cetane IQT |
|---|---|
| 0 | 9.69 |
| 25 | 13.91 |
| 50 | 22.72 |
| 75 | 35.55 |
| 100 | 51.73 |

This Example shows that the DMI cetane number is sufficient for utilization as fuel, and mixtures of isosorbide, ethanol, water and DMI can be obtained at cetane number higher than 40, even without the addition of a combustion improver.

Still, DMI composition is $C_8H_{14}O_4$, which equals to an oxygen content of 34.73% by mass. It is well known that oxygen contents of this order in the ignition of Diesel cycle engines inhibit soot emission in combustion gases.

EXAMPLE 6

Isosorbide dimethyl ether (DMI) was mixed to petroleum-derived diesel fuel at treat rates of 25, 50 and 75 mass % DMI. For the 25 mass % condition isosorbide was completely soluble, while at 50 and 75% phase separation occurred. Then 8 g of castor oil methyl ester (castor oil biodiesel) were added for each 100 g of the DMI-diesel fuel mixture, as co-solvent, in order to obtain complete mixture.

Table 6 below lists IQT data for the mixtures.

TABLE 6

| DMI content, mass % | cetane IQT |
|---|---|
| 0 | 39.77 |
| 25 | 40.22 |

TABLE 6-continued

| DMI content, mass % | cetane IQT |
|---|---|
| 50 | 42.27 |
| 75 | 49.22 |

Between 25 and 50 mass % DMI two-phase formation was observed, which can be prevented by addition of a co-solvent of oxygen content lower than that of DMI, such as biodiesel, or a surfactant agent.

Example 6 shows that it is possible to obtain solutions of diesel fuel and DMI without phase separation and without co-solvent, provided these solutions contain less than 50 mass % DMI. Further, it is demonstrated that DMI can be added to diesel fuel, the mixture being performed in the fuel tank itself, provided either the diesel fuel contains an amount of co-solvent or DMI contains an amount of co-solvent or other surfactant agent.

Figure 3:
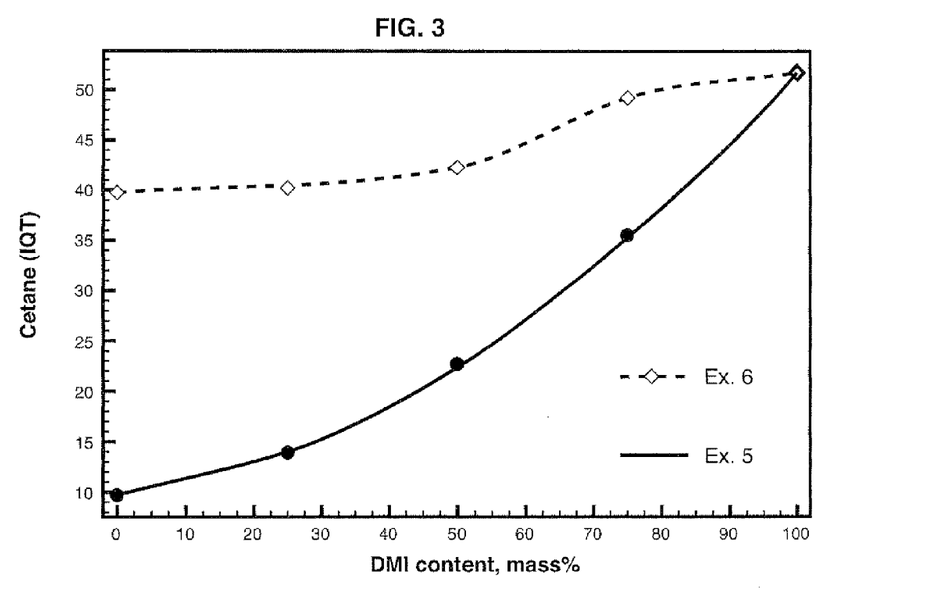
FIG. 3 is a graph which illustrates the effect on the fuel ignition of the addition of dimethyl isosorbide (DMI) both in the mixture of isosorbide, ethanol and water and in the mixture with diesel fuel according to examples 5 and 6.

FIG. 3 shows the positive effect of DMI addition for increasing cetane number both in the mixture with isosorbide (Example 5) and in the mixture with diesel fuel (Example 6).

EXAMPLE 7

This Example illustrates a fuel composition comprising castor oil biodiesel, DMI, diesel fuel, isosorbide, water and ethanol, in the amounts stated in Table 7. IQT data for the Example 7 mixture was 38.19.

From this mixture and other ones it could be observed that the added amounts of biodiesel and DMI should be larger than the added amounts of isosorbide, ethanol and water (if present) to assure a single phase fuel composition.

TABLE 7

| component | mass % |
|---|---|
| Diesel fuel | 28.7 |
| biodiesel | 28.6 |
| DMI | 33.1 |
| isosorbide | 7.6 |
| ethanol | 1 |
| water | 1 |

EXAMPLE 8

In Example 8 mixtures of DMI with ISDN as ignition improver are presented.

Table 8 lists IQT data for the mixtures.

TABLE 8

| ISDN content, mass % | cetane IQT |
|---|---|
| 0 | 51.73 |
| 0.5 | 62.55 |
| 2.0 | 76.78 |

Figure 4:
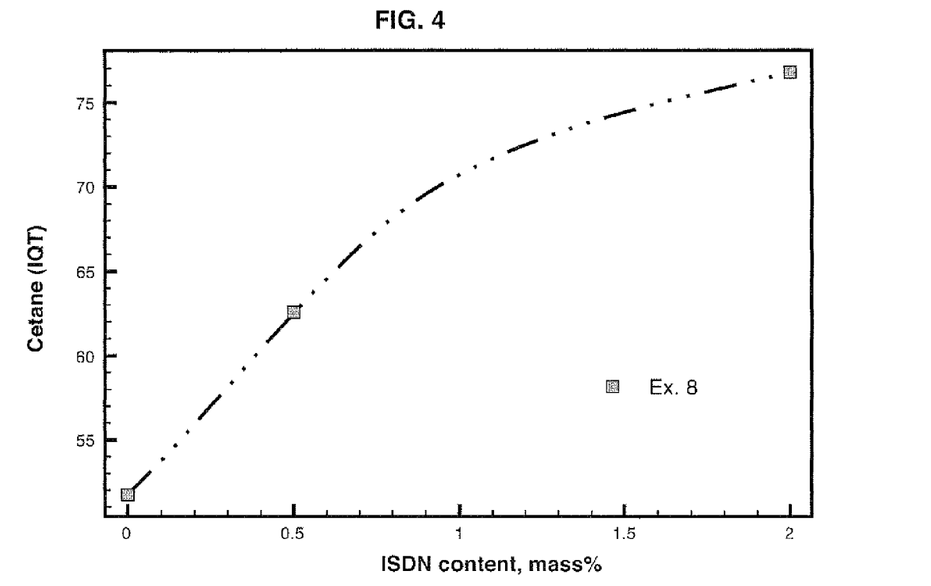
FIG. 4 is a graph which illustrates the effect of the addition of isosorbide dinitrate on the ignition of dimethyl isosorbide (DMI) according to Example 8.

FIG. 4 shows data for cetane increase when ISDN is admixed to DMI. Significant IQT figures can be obtained. Surprisingly, the gain of the ignition improver (increase in IQT units per mass % added) is significantly higher in DMI than in petroleum-derived diesel fuel and isosorbide.

EXAMPLE 9

Example 9 presents estimates of the solubilization ability of further hydrocarbyl-derived compounds of isosorbide in hydrocarbons, as compared to dimethyl isosorbide and isosorbide.

Table 9 shows results of an estimate of the octanol/water partition coefficient. Higher partition coefficient means higher affinity for the organic phase.

Table 9 lists the representations of the various classes of hydrocarbyl derivatives of isosorbide, including mono- and dialkyl isosorbides, mono- and diaryl, alkyl, aryl isosorbides and dicycloalkyl isosorbides.

TABLE 9

| SIDE CHAIN GROUPS | LOG(p) Estimated by the Viswanadhan et al., J. Chem. Inf. Comput. Sci., 29, 163(1989) method |
|---|---|
| (isosorbide) | −1.11 |
| 2 × C1 (dimethyl) | −0.55 |
| 2 × C2 (diethyl) | 0.13 |
| 2 × C3 (dipropyl) | 1.07 |
| 2 × C4 (dibutyl) | 1.86 |
| 2 × C5 (dipentyl) | 2.65 |
| 2 × C6 (dihexyl) | 3.45 |
| 2 × Bz (diphenyl) | 3.01 |
| 2 × iC4 (isobutyl) | 1.11 |
| C1. C2 (methyl, ethyl) | −0.21 |
| C2 (ethyl) | −0.49 |
| C2. Bz (ethyl, phenyl) | 1.57 |
| 2 × Cyclo6 (dicyclohexane) | 2.62 |

Estimations show the better solubility of isosorbide-derived compounds in hydrocarbons with increasing length of the chains linked to at least one of the isosorbide original OH groups.

EXAMPLE 10

To a 50-mL dimethyl isosorbide (DMI) volume were added increasing amounts of water or of ethanol and water solutions. Water and ethanol were shown to be soluble in DMI in all the dilutions employed (from 10 to 90 mass % DMI in water and from 10 to 90 mass % DMI in ethanol).

The addition of 1% mass water in diesel fuel results in cetane reduction of 0.5 units. For dimethyl isosorbide, it is possible to add up to 20 mass % water, or as long as IQT is higher than 40 without ISDN addition. Addition of larger amounts of water requires the supplement of an ignition improver, which preferably isosorbide dinitrate.

Ethanol has low cetane (8) but can be admixed to DMI up to nearly 20 mass %, or as long as IQT is higher than 40, without ISDN addition. Addition of larger amounts of ethanol requires the supplement of an ignition improver, which preferably is isosorbide dinitrate.

Compositions including DMI, water, ethanol and ISDN can be employed as Diesel cycle engine fuel of the present invention, so as to hold IQT above 40.

EXAMPLE 11

To a 50-mL dimethyl isosorbide (DMI) volume were added increasing amounts of the biodiesel utilized in Example 6. Dimethyl isosorbide has revealed to be soluble in biodiesel in all concentrations employed (from 10 to 90 mass % DMI in biodiesel).

Example 11 demonstrates that it is possible to formulate a Diesel cycle engine fuel containing DMI and biodiesel.

The Examples show the viability of the invention—to utilize isosorbide and related products in a Diesel cycle engine—and are merely illustrative, so that they should not be construed as limiting the scope of the invention.

The invention claimed is:

1. A fuel composition for diesel cycle engines, the composition comprising at least one dianhydrohexitol compound of general formula and/or its hydrocarbyl ethers or nitric ethers derived compounds, where substituents R' and R" are —$NO_2$, and the dianhydrohexitol is isosorbide dinitrate (ISDN).

2. The fuel composition according to claim 1, wherein said compositions comprise between 0.01% and 5 mass % of the isosorbide dinitrate derived compound.

3. The fuel composition according to claim 2, wherein said compositions comprise between 0.05% and 2 mass % of the isosorbide dinitrate derived compound.

4. The fuel composition according to claim 1, wherein the said isosorbide dinitrate is added to a petroleum-derived fuel selected from diesel fuel.

5. The fuel composition according to claim 1, wherein said compositions comprise isosorbide dinitrate added to dianhydrohexitols and/or hydrocarbyl ethers of dianhydrohexitols.

6. The fuel composition according to claim 5, wherein said compositions comprise the isosorbide dinitrate added to dimethyl isosorbide.

7. The fuel composition according to claim 6, wherein the cetane gain shown for a certain mass of isosorbide dinitrate is significantly higher in the ignition of dimethyl isosorbide than in the ignition of state-of-the-art petroleum-derived diesel fuel.

8. The fuel composition according to claim 1, wherein the dianhydrohexitol is added of water up to 20 mass %, keeping the IQT of at least 40, and above 20 mass % by ISDN addition.

9. The fuel composition according to claim 8, wherein such compositions are added of between 0.01% and 5 mass % of isosorbide dinitrate (ISDN).

10. The fuel composition according to claim 9, wherein such compositions are added of between 0.05% and 2 mass % of isosorbide dinitrate (ISDN).

11. The fuel composition according to claim 1, wherein the dianhydrohexitol added of ethanol, keeping an IQT value of at least 40, and wherein such compositions are added of between 0.01% and 5 mass % of isosorbide dinitrate (ISDN).

12. Compositions according to claim 11, wherein such compositions are added of between 0.05% and 2 mass % of isosorbide dinitrate (ISDN).

13. The fuel composition according to claim 1, wherein the dianhydrohexitol is added of water and ethanol, keeping an IQT value of at least 40, and wherein such compositions are added of between 0.01% and 5 mass % of isosorbide dinitrate (ISDN).

14. The fuel composition according to claim 13, wherein such compositions are added of between 0.05% and 2 mass % of isosorbide dinitrate (ISDN).

* * * * *